(12) United States Patent
Trinh et al.

(10) Patent No.: US 8,210,280 B2
(45) Date of Patent: Jul. 3, 2012

(54) BIT BASED FORMATION EVALUATION USING A GAMMA RAY SENSOR

(75) Inventors: Tu Tien Trinh, Houston, TX (US); Eric Sullivan, Houston, TX (US); David A. Curry, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 1 day.

(21) Appl. No.: 12/250,072

(22) Filed: Oct. 13, 2008

(65) Prior Publication Data

US 2010/0089645 A1    Apr. 15, 2010

(51) Int. Cl.
*E21B 47/01* (2006.01)
(52) U.S. Cl. .............................. 175/41; 175/45
(58) Field of Classification Search .................. 175/40, 175/41, 45
See application file for complete search history.

(56) References Cited

U.S. PATENT DOCUMENTS

| | | | |
|---|---|---|---|
| 3,411,361 A | 11/1968 | McLellan | |
| 4,821,563 A | 4/1989 | Maron | |
| 4,941,951 A | 7/1990 | Sheppard et al. | |
| 5,144,589 A | 9/1992 | Hardage | |
| 5,386,724 A | 2/1995 | Das et al. | |
| 5,415,030 A | 5/1995 | Jogi et al. | |
| 5,448,227 A | 9/1995 | Orban et al. | |
| 5,475,309 A | 12/1995 | Hong et al. | |
| 5,720,355 A | 2/1998 | Lamine et al. | |
| 5,798,488 A | 8/1998 | Beresford et al. | |
| 5,813,480 A | 9/1998 | Zaleski, Jr. et al. | |
| 6,057,784 A | 5/2000 | Schaaf et al. | |
| 6,150,822 A | 11/2000 | Hong et al. | |
| 6,230,822 B1 | 5/2001 | Sullivan et al. | |
| 6,419,032 B1 | 7/2002 | Sullivan et al. | |
| 6,429,431 B1 * | 8/2002 | Wilk | 250/363.02 |
| 6,510,389 B1 | 1/2003 | Winkler et al. | |
| 6,516,898 B1 | 2/2003 | Krueger | |
| 6,540,033 B1 | 4/2003 | Sullivan et al. | |
| 6,543,312 B2 | 4/2003 | Sullivan et al. | |
| 6,564,883 B2 | 5/2003 | Fredericks et al. | |
| 6,571,886 B1 | 6/2003 | Sullivan et al. | |
| 6,626,251 B1 | 9/2003 | Sullivan et al. | |
| 6,681,633 B2 | 1/2004 | Schultz et al. | |
| 6,769,497 B2 | 8/2004 | Dubinsky et al. | |

(Continued)

FOREIGN PATENT DOCUMENTS

EP    1365103 A2    11/2003

(Continued)

OTHER PUBLICATIONS

Dateline Los Almos, a Monthly Publication of Los Almos National Laboratory, January Issue 1997, pp. 1-8.

(Continued)

*Primary Examiner* — William P Neuder
(74) *Attorney, Agent, or Firm* — Cantor Colburn

(57) ABSTRACT

A drill bit made according to one embodiment includes at least a gamma ray sensor configured to provide signals representative of a presence and/or amount of a naturally occurring gamma ray source when the drill bit is used for cutting into a formation. A circuit may be configured to process signals from the gamma ray sensor to provide an estimate a parameter relating to the naturally occurring gamma ray source, which may used for purposes such as optimizing drilling parameters and geosteering.

19 Claims, 3 Drawing Sheets

U.S. PATENT DOCUMENTS

| | | | |
|---|---|---|---|
| 6,796,746 B2 * | 9/2004 | Jessmore et al. | 405/266 |
| 6,850,068 B2 | 2/2005 | Chemali et al. | |
| 7,046,165 B2 | 5/2006 | Beique et al. | |
| 7,058,512 B2 | 6/2006 | Downton | |
| 7,066,280 B2 | 6/2006 | Sullivan et al. | |
| 7,143,844 B2 | 12/2006 | Alft et al. | |
| 7,172,037 B2 * | 2/2007 | Dashevskiy et al. | 175/25 |
| 7,207,215 B2 | 4/2007 | Spross et al. | |
| 7,278,499 B2 | 10/2007 | Richert et al. | |
| 7,308,937 B2 | 12/2007 | Radford et al. | |
| 7,350,568 B2 | 4/2008 | Mandal et al. | |
| 7,387,177 B2 | 6/2008 | Zahradnik et al. | |
| 7,497,276 B2 | 3/2009 | Pastusek et al. | |
| 7,506,695 B2 | 3/2009 | Pastusek et al. | |
| 7,510,026 B2 | 3/2009 | Pastusek et al. | |
| 2001/0042643 A1 | 11/2001 | Krueger et al. | |
| 2001/0054514 A1 | 12/2001 | Sullivan et al. | |
| 2004/0069539 A1 | 4/2004 | Sullivan et al. | |
| 2004/0222018 A1 | 11/2004 | Sullivan et al. | |
| 2005/0161258 A1 | 7/2005 | Lockerd, Sr. et al. | |
| 2005/0200498 A1 | 9/2005 | Gleitman | |
| 2006/0065395 A1 | 3/2006 | Snell | |
| 2006/0175057 A1 | 8/2006 | Mandal et al. | |
| 2007/0105339 A1 | 5/2007 | Faris | |
| 2007/0114062 A1 | 5/2007 | Hall et al. | |
| 2007/0186639 A1 | 8/2007 | Spross et al. | |
| 2007/0272442 A1 * | 11/2007 | Pastusek et al. | 175/40 |
| 2008/0060848 A1 | 3/2008 | Pastusek et al. | |
| 2008/0065331 A1 | 3/2008 | Pastusek et al. | |
| 2008/0066959 A1 | 3/2008 | Pastusek et al. | |

FOREIGN PATENT DOCUMENTS

| | | | |
|---|---|---|---|
| EP | 1607571 A2 | 12/2005 | |

OTHER PUBLICATIONS

Written Opinion of the International Searching Authority mailed Jun. 24, 2010 for International Application No. PCT/US2009/063809.

Schultz, Roger L et al.; "Oilwell Drillbit Failure Detection Using Remote Acoustic Sensing," Proceedings of the American Control Conference, Anchorage, AK May 8-10, 2002, pp. 2603-2608.

* cited by examiner

BIT BASED FORMATION EVALUATION USING A GAMMA RAY SENSOR

BACKGROUND INFORMATION

1. Field of the Disclosure

This disclosure relates generally to drill bits that include sensors for providing measurements relating to naturally occurring gamma ray sources.

2. Brief Description of the Related Art

Oil wells (wellbores) are usually drilled with a drill string that includes a tubular member having a drilling assembly (also referred to as the bottom hole assembly or "BHA") with a drill bit attached to the bottom end thereof. The drill bit is rotated to disintegrate the earth formations to drill the wellbore. The BHA includes devices and sensors for providing information about a variety of parameters relating to the drilling operations (drilling parameters), behavior of the BHA (BHA parameters) and formation surrounding the wellbore being drilled (formation parameters). Drilling parameters include weight-on-bit ("WOB"), rotational speed (revolutions per minute or "RPM") of the drill bit and BHA, rate of penetration ("ROP") of the drill bit into the formation, and flow rate of the drilling fluid through the drill string. The BHA parameters typically include torque, whirl and stick-slip. Formation parameters include the various characteristics of the formation, such as resistivity, porosity and permeability.

Information relating to the lithology of a formation may be use useful in several aspects of wellbore construction. In many instances, wellbores are formed along predetermined paths and may intersect a variety of formations. During drilling, a driller may control the drilling parameters such as weight on bit, drilling fluid flow through the drill pipe, drill string rotational speed and drilling mud characteristics. The downhole operating conditions can be dynamic and drilling parameter may require adjustments to efficiently and cost-effectively drill the formation. Knowledge of the formation may be one factor used to adjust these drilling parameters. Also, it may be desirable to drill a wellbore at a specified distance from fluid contacts within the reservoir or from bed boundaries defining the top of a reservoir. Thus, knowledge of the lithology of the formation may be useful in appropriate placing such a wellbore.

Therefore, there is a need for devices, systems and methods for evaluating formations during drilling of a wellbore.

SUMMARY

In aspects, the present disclosure provides a drill bit that includes a bit body and a gamma ray sensor in the bit body. The gamma ray sensor is configured to detect naturally occurring gamma rays from a formation being drilled. The gamma ray sensor may be integrated into a cutter positioned on the bit body, in a shank, or any other suitable location. The gamma ray sensor may be configured to a naturally occurring gamma ray source such as potassium, uranium and/or thorium.

In aspects, the present disclosure provides a method of making a drill bit. The method may include placing in a bit body of the drill bit a gamma ray sensor configured to provide signals representative of a naturally occurring gamma ray source in a formation being drilled.

In aspects, the present disclosure provides a drilling system for use in drilling a wellbore in an earth formation. The drilling system may include a drill bit having a bit body positioned at an end of a drill string; a gamma ray sensor configured to provide signals representative of one or more naturally occurring gamma ray sources in a formation being drilled and that is positioned in the bit body; and a processor configured to receive data from the gamma ray sensor and estimate a desired parameter of interest relating to the formation being drilled. The desired parameter of interest may be a lithology of the formation and/or a bed boundary.

In aspects, the present disclosure provides a method for drilling a wellbore in an earth formation. The method may include drilling the wellbore with a drill bit having a gamma ray sensor; and detecting one or more naturally occurring gamma ray sources in a formation being drilled using the gamma ray sensor. The method may further include comprising processing signals from the gamma ray sensor. The method may also include estimating a location of a bed boundary by processing the signals, estimating a lithology of a formation being drilled by processing the signals, and/or adjusting at least one drilling parameter after processing the signals.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

The present disclosure relates to devices and methods for obtaining information relating to naturally occurring gamma ray sources by using sensors positioned in a drill bit. The present disclosure is susceptible to embodiments of different forms. The drawings show and the written specification describes specific embodiments of the present disclosure with the understanding that the present disclosure is to be considered an exemplification of the principles of the disclosure, and is not intended to limit the disclosure to that illustrated and described herein.

Figure 1:
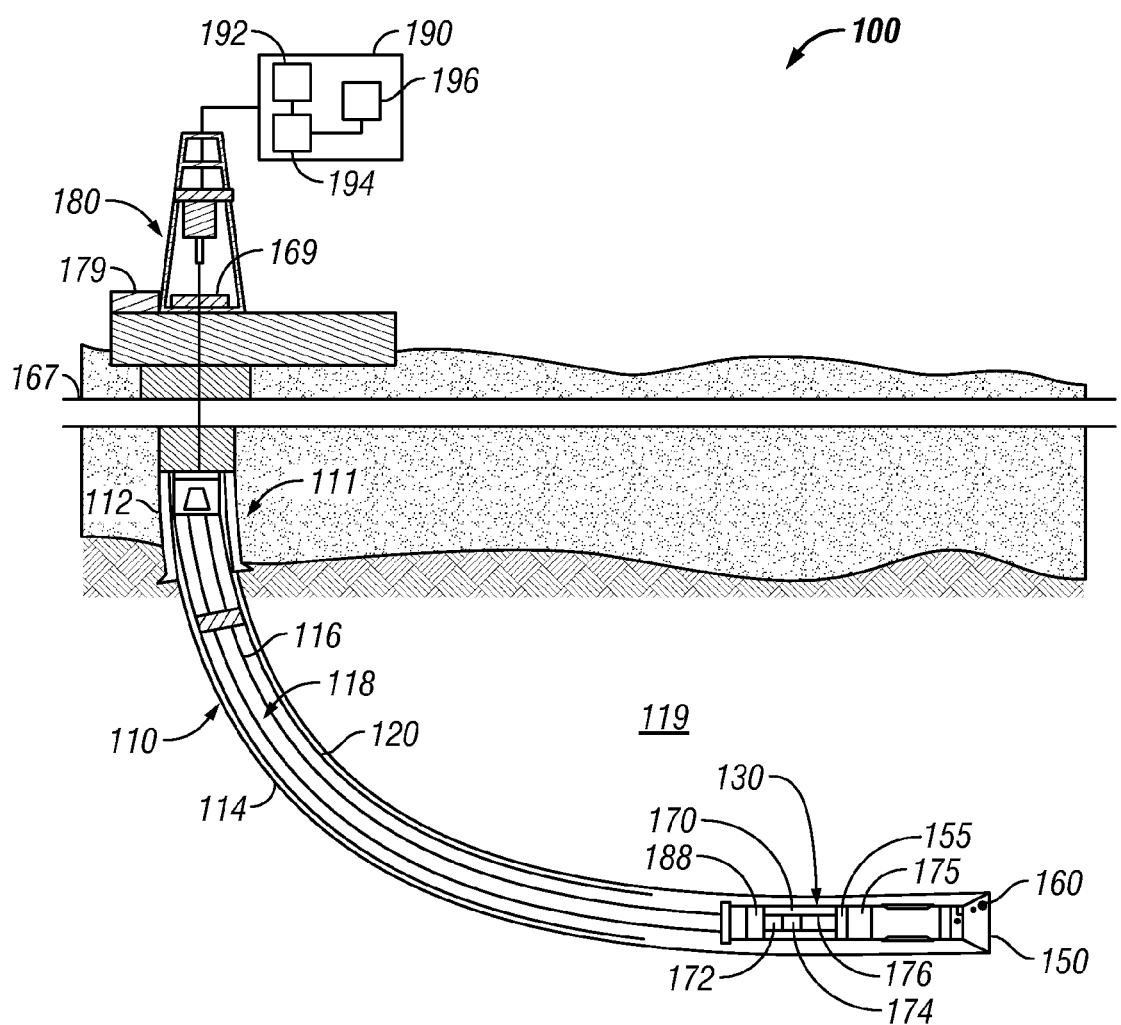
FIG. 1 is a schematic diagram of a drilling system that includes a drill string that has a drill bit made according to one embodiment of the disclosure for drilling wellbores.

FIG. 1 is a schematic diagram of an exemplary drilling system 100 that may utilize drill bits disclosed herein for drilling wellbores. FIG. 1 shows a wellbore 110 that includes an upper section 111 with a casing 112 installed therein and a lower section 114 that is being drilled with a drill string 118. The drill string 118 includes a tubular member 116 that carries a drilling assembly 130 (also referred to as the bottom hole assembly or "BHA") at its bottom end. The tubular member 116 may be made up by joining drill pipe sections or it may be coiled tubing. A drill bit 150 is attached to the bottom end of the BHA 130 for disintegrating the rock formation to drill the wellbore 142 of a selected diameter in the formation 119. Not shown are devices such as thrusters, stabilizers, centralizers, and devices such as steering units for steering the drilling assembly 130 in a desired direction. The terms wellbore and borehole are used herein as synonyms.

The drill string 118 is shown conveyed into the wellbore 110 from a rig 180 at the surface 167. The exemplary rig 180 shown in FIG. 1 is a land rig for ease of explanation. The apparatus and methods disclosed herein may also be utilized with an offshore rigs used for drilling wellbores under water. A rotary table 169 or a top drive (not shown) coupled to the drill string 118 may be utilized to rotate the drill string 118 at the surface to rotate the drilling assembly 130 and thus the drill bit 150 to drill the wellbore 110. A drilling motor 155 (also referred to as "mud motors") may also be provided to rotate the drill bit. A control unit (or controller) 190, which may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, a data storage device (or a computer-readable medium) 194 for storing data and computer programs 196. The data storage device 194 may be any suitable device, including, but not limited to, a read-only memory (ROM), a random-access memory (RAM), a flash memory, a magnetic tape, a hard disc and an optical disk. To drill a wellbore, a drilling fluid from a source 179 is pumped under pressure into the tubular member 116. The drilling fluid discharges at the bottom of the drill bit 150 and returns to the surface via the annular space (also referred as the "annulus") between the drill string 118 and the inside wall of the wellbore 110.

Still referring to FIG. 1, the drill bit 150 includes one or more sensors 160 and related circuitry for estimating one or more parameters relating to a formation being drilled and, in particular, the presence of one or more naturally occurring gamma ray sources. By naturally occurring, it is meant that the gamma rays being emitted by the formation are not induced by a source on the drill string. The drilling assembly 130 may further include one or more downhole sensors (also referred to as the measurement-while-drilling (MWD) sensors (collectively designated by numeral 175) and at least one control unit (or controller) 170 for processing data received from the MWD sensors 175 and the drill bit 150. The controller 170 may include a processor 172, such as a microprocessor, a data storage device 174 and a program 176 for use by the processor to process downhole data and to communicate data with the surface controller 190 via a two-way telemetry unit 188. The telemetry unit 188 may utilize communication uplinks and downlinks. Exemplary communications may include mud pulse telemetry and data conductor (not shown) positioned along the drill string 118. The data conductors may include metal wires, fiber optical cables, or other suitable data carriers.

The MWD sensors 175 may includes sensors for measuring near-bit direction (e.g., BHA azimuth and inclination, BHA coordinates, etc.), dual rotary azimuthal gamma ray, bore and annular pressure (flow-on & flow-off), temperature, vibration/dynamics, multiple propagation resistivity, and sensors and tools for making rotary directional surveys. Exemplary sensors may also include sensors for determining parameters of interest relating to the formation, borehole, geophysical characteristics, borehole fluids and boundary conditions. These sensor include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), and boundary condition sensors, sensors for measuring physical and chemical properties of the borehole fluid.

Figure 2:
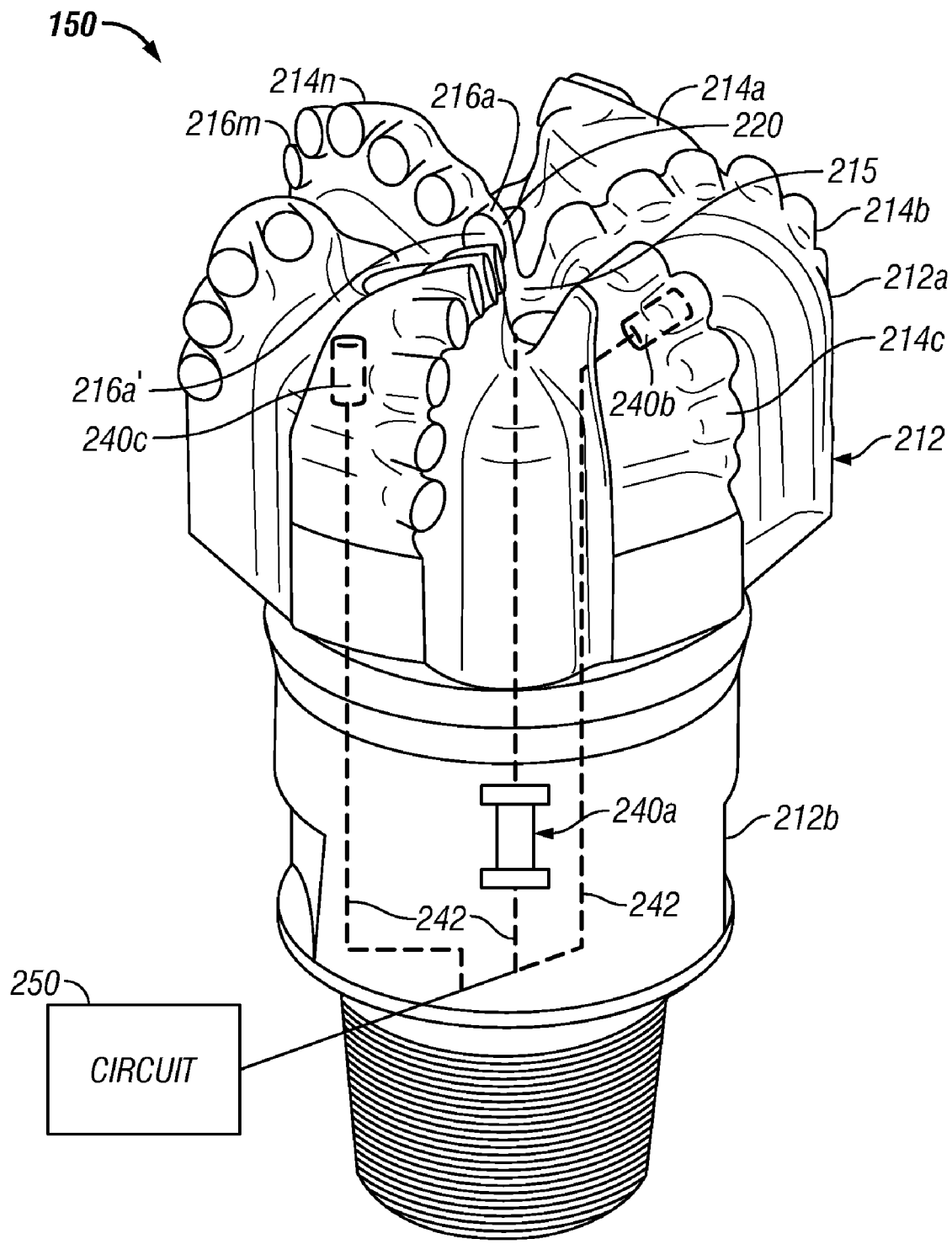
FIG. 2 is an isometric view of an exemplary drill bit showing placement of a gamma ray sensor in the drill bit and an electrical circuit for at least partial processing the signals generated by the gamma ray sensor according to one embodiment of the disclosure.

FIG. 2 shows an isometric view of an exemplary drill bit 150 that includes a gamma ray sensor 240 embedded therein according to one embodiment of the disclosure. A PDC drill bit is shown for explanation purposes. Any other type of drill bit may be utilized for the purpose of this disclosure. The drill bit 150 is shown to include a drill bit body 212 comprising a cone 212a and a shank 212b. The cone includes a number of blade profiles (or profiles) 214a, 214b, ... 214n. A number of cutters are placed along each profile. For example, profile 214a is shown to contain cutters 216a-216m. All profiles are shown to terminate at the bottom of the drill bit 215. Each cutter has a cutting surface or cutting element, such as element 216a' of cutter 216a, that engages the rock formation when the drill bit 150 is rotated during drilling of the wellbore. Each cutter 216a-216m has a back rake angle and a side rake angle that defines the cut made by that cutter into the formation.

FIG. 2 illustrates a variety of positions or locations for the gamma ray sensor. In one arrangement, a gamma ray sensor 240a may be placed in the shank 212b. In another embodiment, a gamma ray sensor 240b may be integrated into one or more of the cutters 216a-216m. Also, such sensors may be placed at any suitable location in the drill bit 150, including but not limited to the crown 212a, such as gamma ray sensor 240c. The gamma ray sensors 240a,b,c may be configured to receive natural gamma ray emissions from a location axially ahead of the drill bit or an azimuthal location. Conductors 242 provide signals from the sensor package 240 to a circuit 250 for processing such signals. The circuit 250 may be placed in the drill bit or outside the drill bit. A circuit 250 in the shank may be configured to amplify the signals from the gamma ray sensor.

The sensor package 240a,b,c may be configured to utilize gamma ray spectroscopy to determine the amounts of potassium, uranium and thorium concentrations that naturally occur in a geological formation. As is known, measurements of gamma radiation from these elements are possible because these elements are associated with radioactive isotopes that emit gamma radiations at characteristics energies. The amount of each element present within a formation may be determined by its contribution to the gamma ray flux at a given energy. Measuring gamma radiation of these specific element concentrations is known as spectral stripping which refers to the subtraction of the contribution of unwanted elements within an energy window, including upper and lower boundaries, set to encompass the characteristic energy(s) of the desired element within the gamma ray energy spectrum. Because of these factors, spectral stripping may be accomplished in practice by calibrating the tool initially in an artificial formation with known concentrations of potassium, uranium and thorium under standard conditions. Illustrative devices for detecting or measuring naturally occurring gamma radiation include magnetic spectrometers, scintillation spectrometers, proportional gas counters and semiconductors with solid state counters. For instance, a suitable gamma ray sensor may utilize a sensor element that includes a scintillation crystal and an optically coupled photomultiplier tube. Output signals from the photomultiplier tube may be transmitted to a suitable electronics package which may include pre-amplification and amplification circuits. The amplified sensor signals may be transmitted to the processor 172. In certain applications, scintillation gamma ray detectors, such as those incorporating NaI, may be not be suitable due to their size and use of photomultiplier tubes. Accordingly, in certain embodiments of the disclosure, solid state devices for gamma ray detection may be utilized. An example of such a device is shown in U.S. Pat. No. 5,969,359 to Ruddy et al. Another embodiment of the disclosure uses a photodiode whose long-wavelength cutoff is in the short-wavelength range having reduced temperature sensitivity is used in downhole applications. It may be matched with scintillation devices having an output matched to the response curve of the photodiode for use with nuclear logging devices. Such a device is disclosed in U.S. patent application Ser. No. 11/503,688 of Estes et al., having the same assignee as the present disclosure and the contents of which are incorporated herein by reference. It is also envisaged in the present disclosure that downhole cooling of the gamma ray sensor may be provided using a quantum thermo-tunneling of electrons. Such a disclosure is found in U.S. patent application Ser. No. 11/087,362 of DiFoggio et al., having the same assignee as the present disclosure and the contents of which are incorporated herein by reference.

It should be appreciated that a bit-based gamma ray sensor configured to detect naturally occurring gamma ray sources may provide an early indication, or even a first indication, of a lithology or change in lithology in the vicinity of the bit body 150. In embodiments, the signals from the bit-based gamma ray sensor may be used to estimate an energy signature for the formation being drilled. Thereafter, the detected energy signature may be compared or correlated with the energy signatures from reference formations having a known lithology. This comparison or correlation may be used to estimate or predict the lithology of the formation being drilled. In one embodiment, the sensor package 240 may provide the primary or only measurements from which a lithology or a change in lithology may be estimated. In other embodiments, the measurements provided by the sensor package 240 may be utilized in conjunction with the measurements provided by the formation evaluation sensors of the MWD system 170 to estimate a lithological characteristic or a change in a lithological characteristic.

Figure 3:
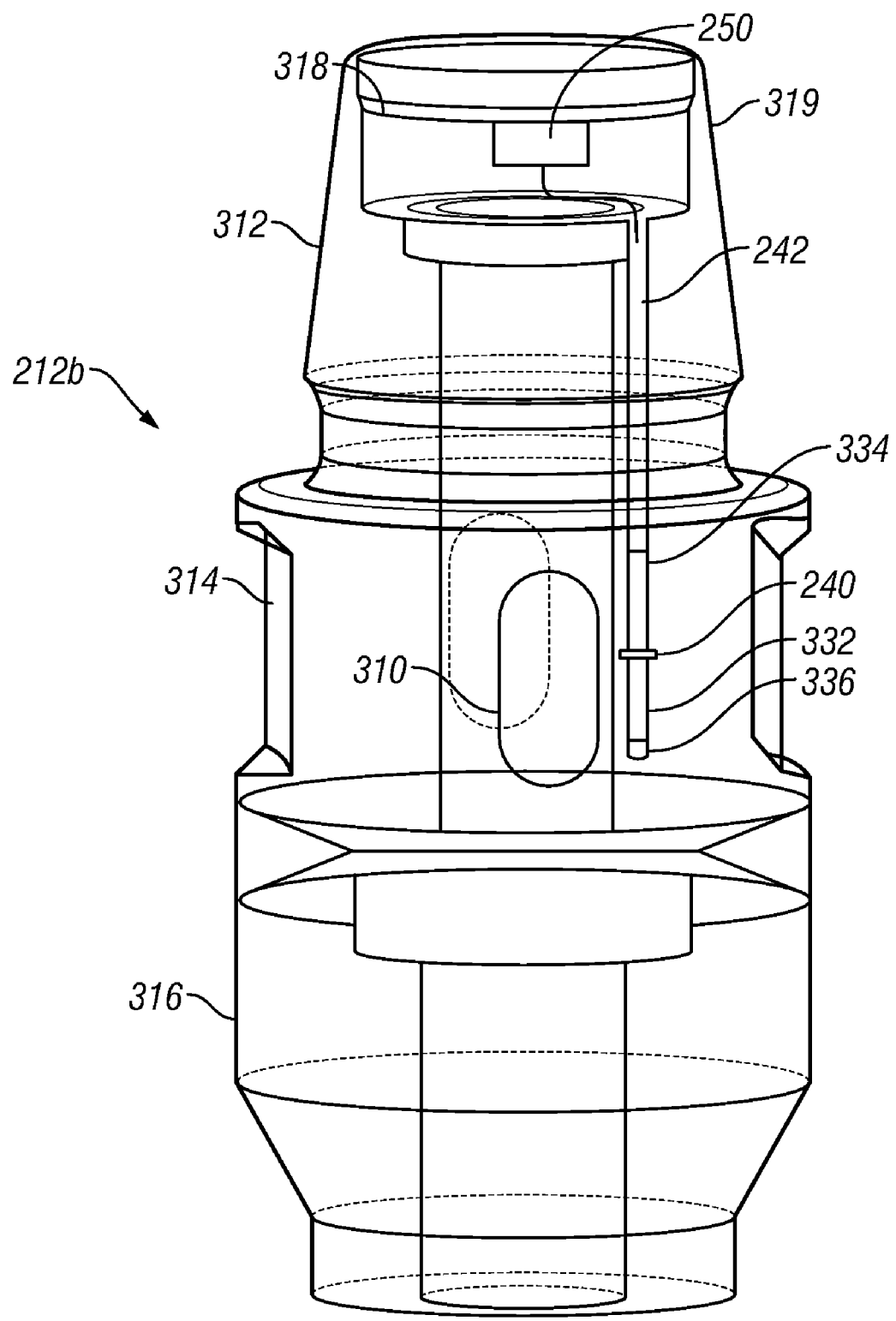
FIG. 3 shows the placement of the gamma ray sensor in the shank of an exemplary drill bit according to one embodiment of the disclosure.

FIG. 3 shows certain details of the shank 212b according to one embodiment of the disclosure. The shank 212b includes a bore 310 therethrough for supplying drilling fluid to the cone 212a of the drill bit 150 and one or more circular sections surrounding the bore 310, such as sections 312, 314 and 316. The upper end of the shank 212b includes a recessed area 318. Threads 319 on the neck section 312 connect the drill bit 150 to the drilling assembly 130. The sensor package 240 containing the gamma ray sensor 332 may be placed at any suitable location in the shank. In one aspect, the sensor package 240 may be placed in a recess 336 in section 314 of the shank. Conductors 242 may be run from the sensors 332 to an electric circuit 250 in the recess 318. The circuit 250 may be coupled to the downhole controller 170 (FIG. 1) by conductors that run from the circuit 250 to the controller 170. In one aspect, the circuit 250 may include an amplifier that amplifies the signals from the sensors 332 and an analog-to-digital (A/D) converter that digitizes the amplified signals. In another aspect, the sensor signals may be digitized without prior amplification. It should be appreciated that all of the components of the sensor package 240 may co-located or may separately located. That is, the sensing elements may be positioned at a cutter, such as cutter 216a, and the signal conditioning elements may be positioned in the shank 212b. The sensor package 240 may be positioned at a surface of the bit body 150. If the sensing elements are recessed into the bit body 150, then a window formed of a media that is transparent to gamma radiation may be interposed between the sensing element and the surface of the bit body 150.

Referring to FIGS. 1-3, during drilling operations, the signals from the sensors 332 or the circuit 450 may be sent to the controller 170. In one mode of operation utilizing downhole drilling control, the controller 170 may processes such signals to estimate a lithological characteristic. Thereafter, the processor 172 in the controller 170 may control one or more drilling parameters based at least in part on the estimation of the lithology. For instance, the processor 172 may be configured to send commands to alter the weight-on-bit or alter rotational speed of the drill bit 150. For example, such commands may be issued to reduce WOB or RPM because a relatively hard layer lies ahead of the drill bit. In another instance, the command may be to increase WOB or RPM because a relatively soft layer lies ahead of the drill bit 150. Stated generally, drilling personnel and/or the surface/downhole control devices can initiate changes to the drilling parameters to optimally drill a given formation as the drilling assembly 130 enters that formation.

In a mode of operation utilizing surface control, the sensor signals or the computed values of the measured gamma rays may be determined by the controller 170 and sent to the surface controller 40 for further processing. The measured or detected gamma rays may be used to estimate an energy signature of the formation being drilling. Thereafter, this estimated energy signature may compared against the energy signatures of formations having a known lithology to estimate the lithology of the formation being drilled. In one aspect, the surface controller 140 may utilize any such information to cause one or more changes, including, but not limited to, altering weight-on-bit, rotational speed of the drill bit, and the rate of the fluid flow so as to increase the efficiency of the drilling operations and extend the life of the drill bit 150 and drilling assembly 130. It should be appreciated that the early implementation of adjustments to drilling parameters may provide more efficient drilling and extend the life of the drill bit 150 and/or BHA.

In still another mode of operation, the sensor package 240 may be utilized to geosteer the drilling assembly 130. The measurements furnished by the sensor package 240 may be continuously or periodically processed by the processor 170 and/or 140 to estimate the location of a particular subsurface feature or features. That is, the detected energy signatures may be compared with the predicted energy signature of the subsurface feature or features. This comparison may be utilized to determine whether the subsurface feature is present and the relative location of that subsurface feature. Geosteering objectives may include drilling a deviated borehole at a selected depth proximate to an identified oil-water contact, drilling a wellbore or navigating a formation above an oil-water contacts, maintaining a drilling depth below a gas cap, avoiding a shale lens, and/or steering a course relative to bed boundaries that are of interest in horizontal drilling include hard calcite streaks and intrusives. In some embodiment, the gamma ray sensor measurements may be used to estimate the location of or the distance to fluid contacts, bed boundaries, and other subsurface features that my be utilized to geosteer the drilling assembly 150. In one preferred closed-loop mode of operation, the processors 170 and/or 140 include instructions relating to a desired well profile or trajectory and/or desired characteristics of a target formation. The processors 170 and/or 140 maintain control over aspects of the drilling activity to maintain a desired position or location vis-à-vis a subsurface formation of interest. For instance, during an exemplary operation, the sensor package 240 provides data relating to a naturally occurring gamma ray emissions. The processor 170 may use this data to evaluate the formation ahead of the drill bit 150 and determine the proximity, location or orientation of the drilling assembly 130 relative to a bed boundary or other subsurface feature and, if needed, issue steering instructions that prevents the drilling assembly 130 from exiting the target formation or entering into an undesirable formation. This automated control of the drilling assembly 130 may include periodic two-way telemetric communication with the surface control unit 140 that receives selected sensor data and processed data from the downhole processor 170 and issues command instructions thereto. The command instructions transmitted by the control unit 140 may, for instance, be based on calculations based on data received from surface sensors (not shown) and downhole sensors. The processor 170 reconfigures the steering unit (not shown) of the drilling assembly 130 to re-orient the drilling assembly 130 to drill in the desired direction.

The foregoing description is directed to particular embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

What is claimed is:

1. A drill bit, comprising:
a bit body including a cone having a cutter and a shank having a neck section; and
a gamma ray sensor that is one of embedded in the cone and within a shank of the bit body outside the neck section, the gamma ray sensor configured to detect naturally occurring gamma rays from a formation being drilled.

2. The drill bit of claim 1, wherein the gamma ray sensor is embedded into the cutter.

3. The drill bit of claim 1, wherein the gamma ray sensor is positioned in one of: (i) the shank, (ii) on a blade profile and (iii) proximate the cutter.

4. The drill bit of claim 1, wherein the gamma ray sensor is configured to detect one of: (i) potassium, (ii) uranium and (iii) thorium.

5. The drill bit of claim 1, further comprising a communication link configured to provide data communication between a remote device and the gamma ray sensor.

6. The drill bit of claim 1 further comprising a circuit in the bit body configured to at least partially process signals from the gamma ray sensor.

7. A method of making a drill bit, comprising:
embedding in a bit body of the drill bit a gamma ray sensor configured to provide signals representative of a naturally occurring gamma ray source in a formation being drilled, wherein the bit body includes a cone having a cutter and a shank having a neck section, and wherein the gamma ray sensor is one of embedded in the cone and within the shank of the bit body outside the neck section.

8. The method of claim 7 further comprising placing a circuit in the drill bit configured to process signals from the gamma ray sensor.

9. A drilling system for use in drilling a wellbore in an earth formation, comprising:
a drill string;
a drill bit having a bit body positioned at an end of the drill string, wherein the bit body includes a cone having a cutter and a shank having a neck section;
a gamma ray sensor that is one of integrated in the cone and within the shank of the bit body outside the neck section, the gamma ray sensor configured to provide signals representative of one or more naturally occurring gamma ray sources in a formation being drilled; and
a processor configured to receive data from the gamma ray sensor and estimate a desired parameter of interest relating to the formation being drilled.

10. The drilling system of claim 9 wherein the desired parameter of interest is a lithology of the formation.

11. The drilling system of claim 9 wherein the desired parameter of interest is a bed boundary.

12. The drilling system of claim 9, wherein at least a portion of the processor is placed in the drill bit.

13. A method for drilling a wellbore in an earth formation, comprising:
drilling the wellbore with a drill bit having a gamma ray sensor embedded in a bit body, wherein the bit body includes a cone having a cutter and a shank having a neck section, and wherein the gamma ray sensor is one of embedded in the cone and within the shank of the bit body outside the neck section; and
detecting one or more naturally occurring gamma ray sources in a formation being drilled using the gamma ray sensor.

14. The method of claim 13 further comprising processing signals from the gamma ray sensor.

15. The method of claim 14 further comprising estimating a location of a bed boundary by processing the signals.

16. The method of claim 14 further comprising estimating a lithology of a formation being drilled by processing the signals.

17. The method of claim 14 further comprising adjusting drilling parameter after processing the signals.

18. The method of claim 17 wherein the drilling parameter includes one of: (i) weight-on-bit, and (ii) RPM of the drill bit.

19. The method of claim 14 further comprising changing a direction of drilling after processing the signals.

* * * * *